(12) United States Patent
Lee et al.

(10) Patent No.: US 8,767,803 B2
(45) Date of Patent: Jul. 1, 2014

(54) WIRELESS COMMUNICATION CIRCUIT SUPPORTING ANTENNA DIVERSITY

(75) Inventors: Tsung-Hsuan Lee, Taipei (TW); Chung-Yao Chang, Zhubei (TW); Der-Zheng Liu, Hsinchu County (TW)

(73) Assignee: Realtek Semiconductor Corp., Hsinchu (TW)

( * ) Notice: Subject to any disclaimer, the term of this patent is extended or adjusted under 35 U.S.C. 154(b) by 141 days.

(21) Appl. No.: 13/587,610

(22) Filed: Aug. 16, 2012

(65) Prior Publication Data

US 2013/0051438 A1    Feb. 28, 2013

(30) Foreign Application Priority Data

Aug. 24, 2011   (TW) .............................. 100130400 A

(51) Int. Cl.
*H04B 1/38*   (2006.01)
*H04L 5/16*   (2006.01)

(52) U.S. Cl.
USPC ........... 375/219; 375/267; 375/295; 375/299; 375/316; 375/347

(58) Field of Classification Search
CPC . H04L 27/2647; H04L 1/0071; H04L 1/0003; H04L 1/0618; H04L 1/06; H04B 1/40; H04B 3/23
USPC ................... 375/219, 267, 295, 299, 316, 347
See application file for complete search history.

(56) References Cited

U.S. PATENT DOCUMENTS

| | | | |
|---|---|---|---|
| 4,742,568 A | 5/1988 | Furuya | |
| 6,553,078 B1 | 4/2003 | Akerberg | |
| 7,558,554 B2 | 7/2009 | Hoo et al. | |
| 7,847,752 B2 * | 12/2010 | Li et al. | 343/893 |
| 7,981,751 B2 * | 7/2011 | Zhu et al. | 438/300 |
| 8,225,186 B2 * | 7/2012 | Jin et al. | 714/794 |
| 2009/0270060 A1 | 10/2009 | Hoo et al. | |

FOREIGN PATENT DOCUMENTS

GB        2444538 B      2/2009

* cited by examiner

*Primary Examiner* — Ted Wang
(74) *Attorney, Agent, or Firm* — Birch, Stewart, Kolasch & Birch, LLP

(57) ABSTRACT

A wireless communication circuit is disclosed including: a transceiver for transmitting and receiving signals; and a control circuit coupled with the transceiver for controlling a switching circuit to switch the transceiver to a first antenna set for a first time period and then to switch the transceiver to a second antenna set for a second time period in a test period. If a throughput statistic of the first antenna set with respect to the test period is greater than that of the second antenna set, the control circuit configures the switching circuit to switch the transceiver to the first antenna set after the test period.

18 Claims, 6 Drawing Sheets

WIRELESS COMMUNICATION CIRCUIT SUPPORTING ANTENNA DIVERSITY

CROSS-REFERENCE TO RELATED APPLICATIONS

This application claims the benefit of priority to Taiwanese Patent Application No. 100130400, filed on Aug. 24, 2011; the entirety of which is incorporated herein by reference for all purposes.

BACKGROUND

The present disclosure generally relates to communication technology and, more particularly, to wireless communication circuits supporting antenna diversity mechanism and related computer program products.

In a wireless communication system, communication performance of a wireless communication system may be affected by channel environment. In addition, the orientation and position of the antenna may also degrade the communication performance of a wireless communication system.

The wireless communication system using a single antenna has advantage in terms of lower hardware cost and simpler control mechanism of signal transmission, but its communication quality and communication rate often deteriorate due to poor receiving quality of the single antenna.

When a traditional wireless communication circuit is equipped with multiple antenna to improve the communication quality, multiple sets of receiving circuits are required to respectively process the signals received by different antennas. Such multiple sets of receiving circuits increases the hardware cost, and is thus not a desirable solution.

SUMMARY

In view of the foregoing, it can be appreciated that a substantial need exists for apparatuses that can improve the antenna receiving quality of the wireless communication circuit.

An example embodiment of a wireless communication circuit is disclosed comprising: a transceiver for transmitting and receiving signals; and a control circuit, coupled with the transceiver, for controlling a switching circuit to switch the transceiver to a first antenna set for a first time period and then to switch the transceiver to a second antenna set for a second time period in a test period; wherein if a throughput statistic of the first antenna set with respect to the test period is greater than a throughput statistic of the second antenna set with respect to the test period, the control circuit configures the switching circuit to switch the transceiver to the first antenna set after the test period.

Another example embodiment of a wireless communication circuit is disclosed comprising: a transceiver for transmitting and receiving signals; and a control circuit, coupled with the transceiver, for controlling a switching circuit to switch the transceiver to a first antenna set for a first time period and then to switch the transceiver to a second antenna set for a second time period in a target test period; wherein if a throughput statistic of the first antenna set with respect to a plurality of test periods is greater than a throughput statistic of the second antenna set with respect to the plurality of test periods, the control circuit configures the switching circuit to switch the transceiver to the first antenna set after the target test period.

Yet another example embodiment of a wireless communication circuit is disclosed comprising: a transceiver for transmitting and receiving signals; and a control circuit, coupled with the transceiver and a switching circuit, for controlling the switching circuit to switch the transceiver between a first antenna set and a second antenna set in a first test period such that the first antenna set is coupled with the transceiver for shorter period of time than the second antenna set; wherein if the control circuit configures the switching circuit to switch the transceiver to the first antenna set after the first test period, the control circuit configures the switching circuit to switch the transceiver between the first antenna set and the second antenna set in a second test period such that the first antenna set is coupled with the transceiver for longer period of time than the second antenna set.

It is to be understood that both the foregoing general description and the following detailed description are example and explanatory only and are not restrictive of the invention, as claimed.

DETAILED DESCRIPTION

Reference will now be made in detail to embodiments of the invention, which are illustrated in the accompanying drawings.

The same reference numbers may be used throughout the drawings to refer to the same or like parts or components/operations. Certain terms are used throughout the description and following claims to refer to particular components. As one skilled in the art will appreciate, a component may be referred by different names. This document does not intend to distinguish between components that differ in name but not in function. In the following description and in the claims, the term "comprise" is used in an open-ended fashion, and thus should be interpreted to mean "include, but not limited to . . . ." Also, the phrase "coupled with" is intended to compass any indirect or direct connection. Accordingly, if this document mentioned that a first device is coupled with a second device, it means that the first device may be directly or indirectly connected to the second device through electrical connections, wireless communications, optical communications, or other signal connections with/without other intermediate devices or connection means.

As used herein, the term "and/or" includes any and all combinations of one or more of the associated listed items. In addition, the singular forms "a", "an", and "the" as used herein are intended to include the plural forms as well, unless the context clearly indicates otherwise.

Figure 1:
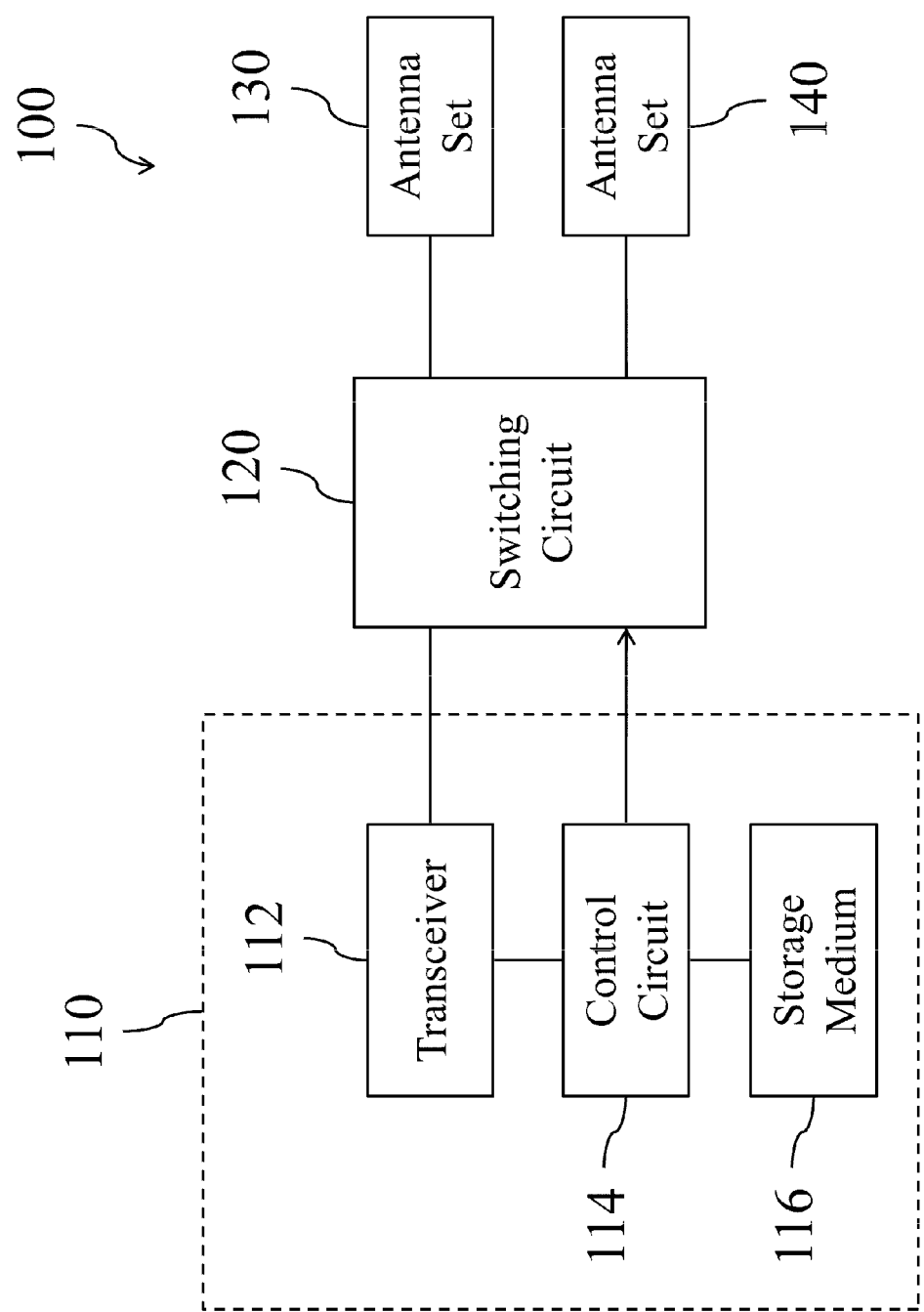
FIG. 1 is a simplified functional block diagram of a wireless communication system according to a first example embodiment.

FIG. 1 is a simplified functional block diagram of a wireless communication system 100 according to a first example embodiment. The wireless communication system 100 comprises a wireless communication circuit 110, a switching circuit 120, an antenna set 130, and an antenna set 140. The wireless communication circuit 110 comprises a transceiver 112, a control circuit 114, and a storage medium 116.

In implementations, the transceiver 112, the control circuit 114, and the storage medium 116 of the wireless communication circuit 110 may be integrated into a single circuit chip. In some embodiments, the wireless communication circuit 110 and the switching circuit 120 may be integrated into a single circuit chip. In addition, each of the antenna set 130 and the antenna set 140 may comprise one or more antenna depending upon the requirements of circuit design. In the embodiments where the antenna set comprises multiple antennas, the antenna set may be coupled to the switching circuit 120, and the switching circuit 120 may be coupled to the transceiver 112.

A computer program product enables the wireless communication system 100 to perform an antenna diversity operation, such as a firmware, is stored in the non-transitory storage medium 116 of the wireless communication circuit 110. The control circuit 114 is coupled with the transceiver 112 and the storage medium 116, and is utilized for executing the computer program product stored in the storage medium 116 to control the wireless communication system 100 to perform the antenna diversity operations. The operations of the wireless communication system 100 will be further described with reference to FIG. 2 and FIG. 3.

Figure 2:
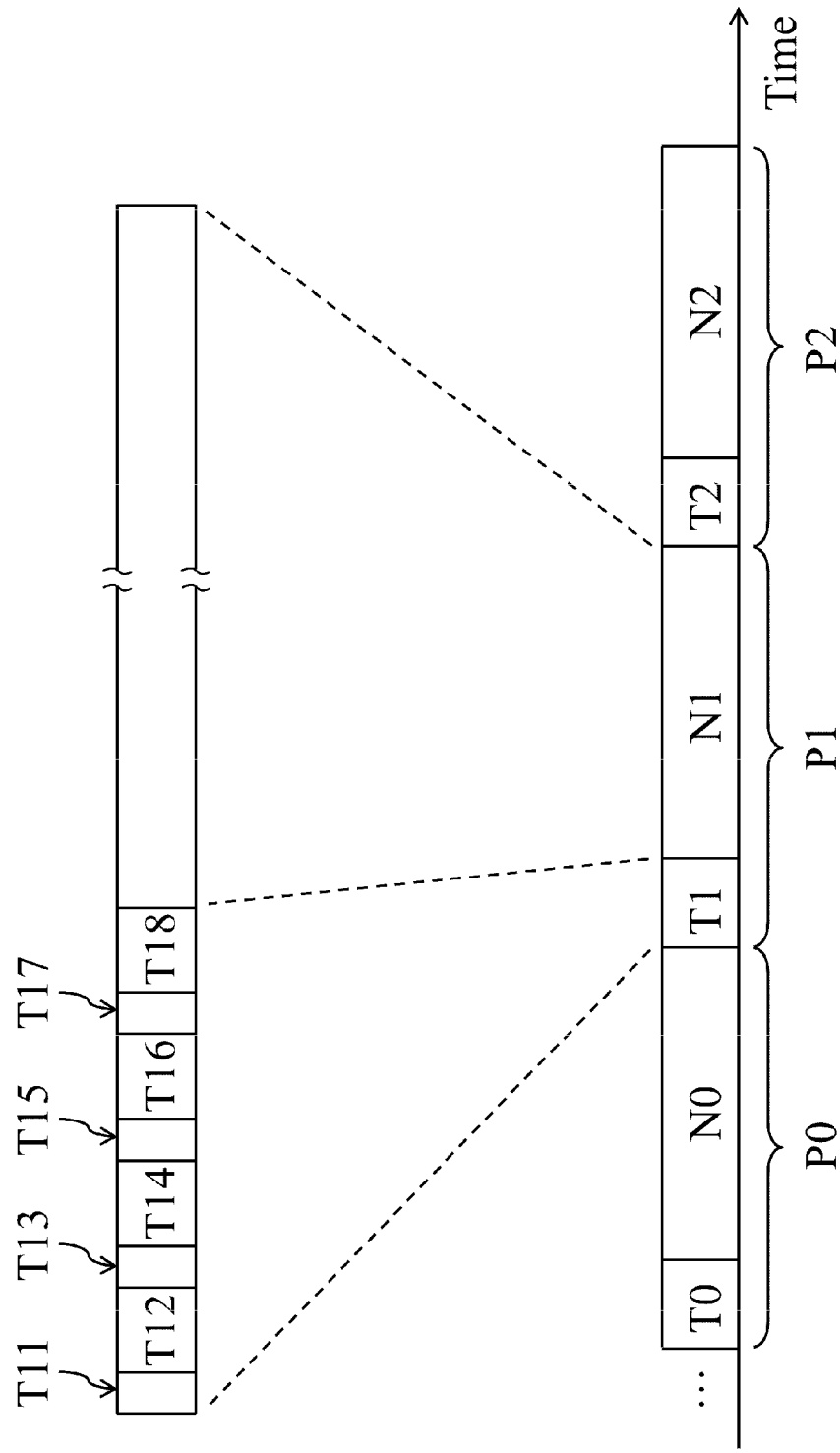
FIG. 2 and FIG. 3 are simplified timing diagrams illustrating antenna diversity operations of the wireless communication system of FIG. 1 in accordance with an example embodiment.
Figure 3:
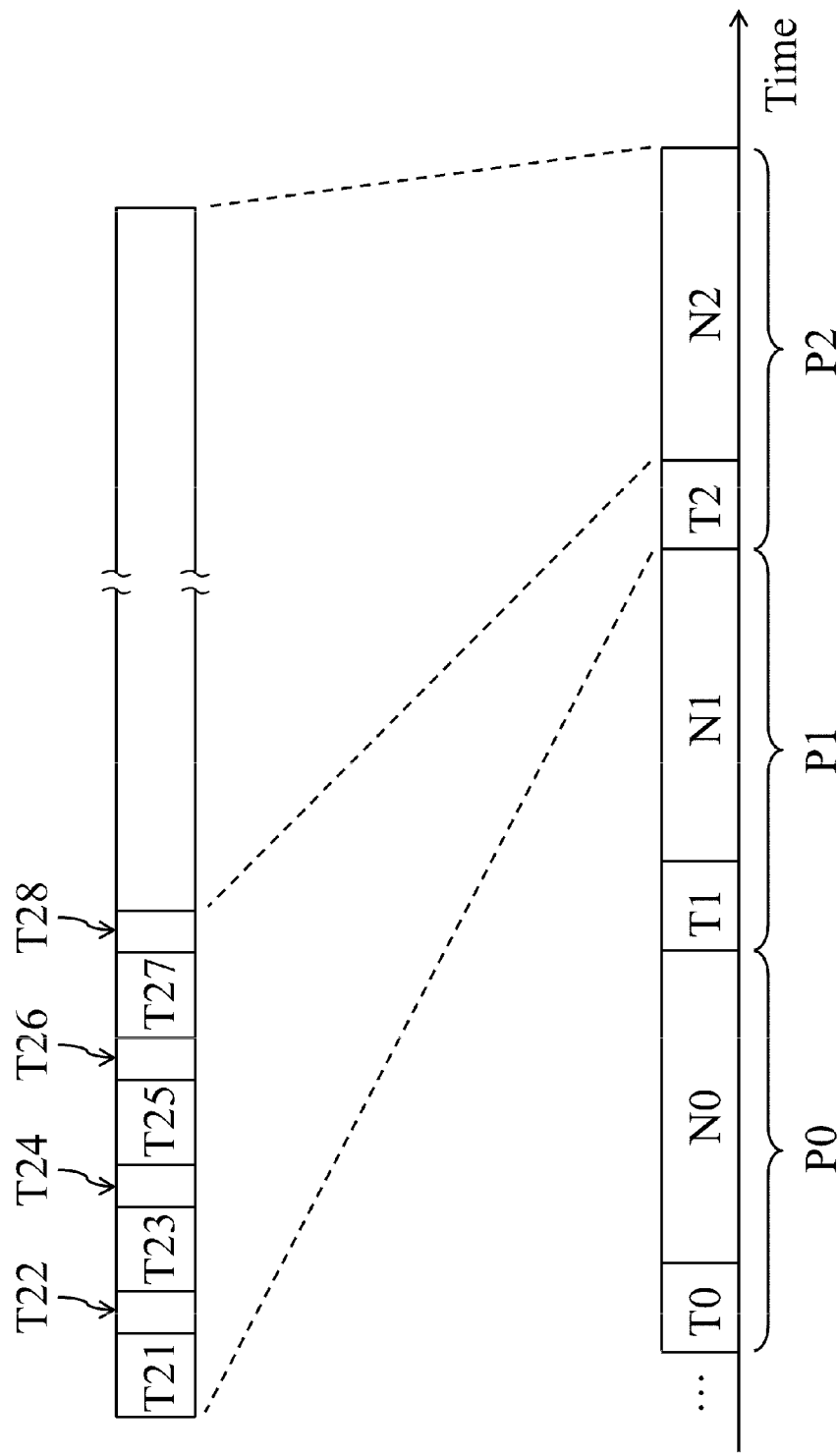

FIG. 2 and FIG. 3 are simplified timing diagrams illustrating antenna diversity operations of the wireless communication system 100 in accordance with an example embodiment. The control circuit 114 of the wireless communication circuit 110 divides the operations of the wireless communication system 100 into multiple periodical operating periods, such as operating periods P0, P1, and P2 shown in FIG. 2 and FIG. 3. In this embodiment, each operating period comprises a test period and a normal operation period. For example, the operating period P0 comprises a test period T0 and a normal operation period N0; the operating period P1 comprises a test period T1 and a normal operation period N1; and the operating period P2 comprises a test period T2 and a normal operation period N2.

In implementations, the control circuit 114 may configure all operating periods to have the same length, and may extend or reduce the length of some operating periods as needed. In addition, the control circuit 114 may configure the test period and the normal operation period of each operating period to be adjacent, or may add an interval period having an appropriate length between the test period and the normal operation period.

In each test period, the control circuit 114 configures the switching circuit 120 to switch the transceiver 112 to the antenna set 130 for a period of time, and then to switch the transceiver 112 to the antenna set 140 for a period of time. When the transceiver 112 is switched to the antenna set 130, the transceiver 112 transmits and receives signal via the antenna set 130, and the control circuit 114 records information regarding throughput of the antenna set 130 during that period. When the transceiver 112 is switched to the antenna set 140, the transceiver 112 transmits and receives signals via the antenna set 140, and the control circuit 114 records information regarding throughput of the antenna set 140 during that period.

In other words, the control circuit 114 records information regarding the throughputs of the antenna set 130 and the antenna set 140 with respect to each test period as a reference basis for use in selecting antenna set in the subsequent normal operation period. The term "throughput" as used herein may be the data amount, such as bit counts or packet counts, of total packets received by and/or transmitted from a particular antenna set, or alternatively, the data amount of total packets received by and/or transmitted from the particular antenna set in a unit time, such as a certain number of bits per second (bps) or packets per second (pps). When calculating the throughput, the control circuit 114 may only take into consideration packets addressing to the wireless communication system 100 for reduction of computation. For example, the control circuit 114 may only take into consideration packets having a destination address or receive address addressing to the wireless communication system 100 when calculating throughput.

Alternatively, the control circuit 114 may only take into consideration packets having a specific coding scheme when calculating the throughput so as to reduce required computations. For example, the control circuit 114 may only record the data amount, such as bit counts or packet counts, of packets having a specific coding scheme received by or transmitted from a particular antenna set in each test period, or only record the data amount of packets having a specific coding scheme received by or transmitted from the antenna set in a unit time. In one embodiment, the packets having a specific coding scheme mentioned above refer to packets coded with modulation and coding scheme 8 (MCS 8) or modulation and coding schemes of greater indexes.

In addition, the control circuit 114 may ignore packets with specific frame types, such as broadcast packets, control packets, and management packets, when calculating the throughput for reduction of computation.

Additionally, in each test period, the control circuit 114 may configure the switching circuit 120 such that different antenna sets are respectively coupled with the transceiver 112 for different lengths of time. If the control circuit 114 configures the switching circuit 120 to switch the transceiver 112 to the antenna set 130 after a particular test period, it means that the antenna set 130 has better receiving quality than the antenna set 140 at that time. In normal situations, the antenna set 130 is likely to have better receiving quality than the antenna set 140 in the next test period. Therefore, the control circuit 114 may configure the switching circuit 120 such that the antenna set 130 is coupled with the transceiver 112 for longer period of time than the antenna set 140 in the next test period.

For example, assuming that the control circuit 114 configures the switching circuit 120 to switch the transceiver 112 to the antenna set 130 after the test period T0, the control circuit 114 in the next test period T1 may configure the switching circuit 120 to switch the transceiver 112 to the antenna set 130 for a first time period and then to switch the transceiver 112 to the antenna set 140 for a second time period, wherein the first time period is longer than the second time period. In this embodiment, since the first and second time periods may be not equal, the throughput may be measured and normalized by time unit, such as bytes per second or bit per second.

As a result, since the transceiver 112 would be coupled to the antenna set having poorer receiving quality for shorter period of time in the test period, adverse effect on the data transmission performance (such as the throughput or data transmission rate) of the wireless communication system 100 caused by the switching of antenna sets can be mitigated.

Alternatively, the control circuit 114 may configure the switching circuit 120 to switch the transceiver 112 between the antenna set 130 and the antenna set 140 for multiple times in each test period, so as to reduce the length of time for each time the transceiver 112 is coupled with the antenna set having poorer receiving quality. In this way, adverse effect on the data transmission performance of the wireless communication system 100 caused by the switching of antenna sets can also be mitigated.

In one embodiment, the control circuit 114 not only configures the switching circuit 120 to switch the transceiver 112 between the antenna set 130 and the antenna set 140 for multiple times in each test period, but also configures the switching circuit 120 such that different antenna sets are respectively coupled with the transceiver 112 for different lengths of time. For example, in the embodiment shown in FIG. 2, the control circuit 114 divides the test period T1 into 8 sub-periods T11-T18, wherein the lengths of the sub-periods T11, T13, T15, and T17 are respectively shorter than the lengths of the sub-periods T12, T14, T16, and T18. Suppose the control circuit 114 configures the switching circuit 120 to switch the transceiver 112 to the antenna set 140 in the normal operation period N0, the control circuit 114 may configure the switching circuit 120 to switch the transceiver 112 to the antenna set 130 in the sub-periods T11, T13, T15, and T17 of the test period T1, and to switch the transceiver 112 to the antenna set 140 in the sub-periods T12, T14, T16, and T18.

Suppose the control circuit 114 decides to control the switching circuit 120 to switch the transceiver 112 to the antenna set 130 after the test period T1, the control circuit 114 may divides the next test period T2 into 8 sub-periods T21~T28, wherein the lengths of the sub-periods T21, T23, T25, and T27 are respectively longer than the lengths of the sub-periods T22, T24, T26, and T28. The control circuit 114 may configure the switching circuit 120 to switch the transceiver 112 to the antenna set 130 in the sub-periods T21, T23, T25, and T27 of the test period T2, and to switch the transceiver 112 to the antenna set 140 in the sub-periods T22, T24, T26, and T28.

The above arrangement further reduces the length of time for each time the transceiver 112 is coupled with the antenna set having poorer receiving quality, thereby further reducing the adverse effect on the data transmission performance of the wireless communication system 100 caused by the switching of antenna sets.

In one embodiment, the control circuit 114 configures the length of each normal operation period to be 10~100 times of the length of each test period. Additionally, in each test period, the control circuit 114 may configure the length of time period during which the transceiver 112 is coupled with the antenna set having better receiving quality to be 4~9 times of the length of time period during which the transceiver 112 is coupled with the antenna set having poorer receiving quality, so as to improve the overall data transmission performance of the wireless communication system 100.

In the wireless communication system 100, the control circuit 114 of the wireless communication circuit 110 may collect throughput statistics for the antenna set 130 and the antenna set 140 by counting respective throughputs of the antenna set 130 and the antenna set 140 in a single test period or in a plurality of test periods, and then configure subsequent operation of the switching circuit 120 according to the resulting throughput statistics. The term "throughput statistic" as used herein may be a throughput or a time average of the throughput of a particular antenna set in a single test period, or may be a sum, an average value, a time average, a moving sum, or a moving average of throughput of the particular antenna set in a plurality of test periods.

For example, the control circuit 114 may compare a throughput statistic of the antenna set 130 with respect to a target test period (such as the test period T0, T1, or T2 described previously) with a throughput statistic of the antenna set 140 with respect to the target test period at the end of the target test period, and then configure the switching circuit 120 according to the comparison result. In one embodiment, if the throughput statistic of the antenna set 130 is greater than the throughput statistic of the antenna set 140, the control circuit 114 determines that the antenna set 130 has better receiving quality at that time. Accordingly, the control circuit 114 configures the switching circuit 120 to switch the transceiver 112 to the antenna set 130 after the target test period, so that the transceiver 112 receives and transmits signals via the antenna set 130 in the subsequent normal operation period. On the contrary, if the throughput statistic of the antenna set 130 is less than the throughput statistic of the antenna set 140, the control circuit 114 configures the switching circuit 120 to switch the transceiver 112 to the antenna set 140 after the target test period.

Alternatively, at the end of a target test period, the control circuit 114 may compare a throughput statistic of the antenna set 130 with respect to a plurality of test periods inclusive of the target test period with a throughput statistic of the antenna set 140 with respect to the plurality of test periods, and then configure the switching circuit 120 according to the comparison result. For example, at the end of a target test period T2, the control circuit 114 may compare a throughput statistic of the antenna set 130 with respect to the test periods T0, T1, and T2 with a throughput statistic of the antenna set 140 with respect to the test periods T0, T1, and T2, and then use the comparison result as the reference basis for determining which antenna set is to be used in the subsequent normal operation period N2. In one embodiment, if the throughput statistic of the antenna set 130 is greater than the throughput statistic of the antenna set 140, the control circuit 114 determines that the antenna set 130 has better receiving quality at that time. Accordingly, the control circuit 114 configures the switching circuit 120 to switch the transceiver 112 to the antenna set 130 after the target test period T2, so that the transceiver 112 receives and transmits signals via the antenna set 130 in the subsequent normal operation period N2. On the contrary, if the throughput statistic of the antenna set 130 is less than the throughput statistic of the antenna set 140, the control circuit 114 configures the switching circuit 120 to switch the transceiver 112 to the antenna set 140 after the test period T2. This approach samples the operations of different antennas more frequently, so as to effectively reduce erroneous determination caused by severe change on throughput in a short period. In implementations, the control circuit 114 may dynamically adjust the amount of test periods depending upon the signal transmission situation.

In another embodiment, the control circuit 114 selects a tentative antenna set by using any of the antenna selection approaches described in the previous embodiments at the end of a target test period, such as the test period T2. Then, the control circuit 114 selects which antenna set is to be used by applying majority rule to the tentative antenna set and antenna selection decisions made in a number of prior test periods, such as the test periods T0 and T1. If the antenna set 130 was selected more frequently than the antenna set 140 in antenna selection decisions made in the prior test periods, the control circuit 114 configures the switching circuit 120 to switch the transceiver 112 to the antenna set 130 after the target test period, so that the transceiver 112 receives and transmits signals via the antenna set 130 in the following normal operation period. On the contrary, if the antenna set 130 was selected less frequently than the antenna set 140 in antenna selection decisions made in the prior test periods, the control circuit 114 configures the switching circuit 120 to switch the transceiver 112 to the antenna set 140 after the target test period. This approach also increases the sampling frequency to the operations of different antennas, so that erroneous determination caused by severe change on throughput in a short period can be effectively reduced.

As elaborated above, the control circuit 114 may dynamically change antenna set to be used by the transceiver 112 according to the environment of the wireless communication system 100. As a result, the receiving quality of the wireless communication system 100 can be greatly improved, thereby increasing the transmission speed of the wireless communication system 100.

Figure 4:
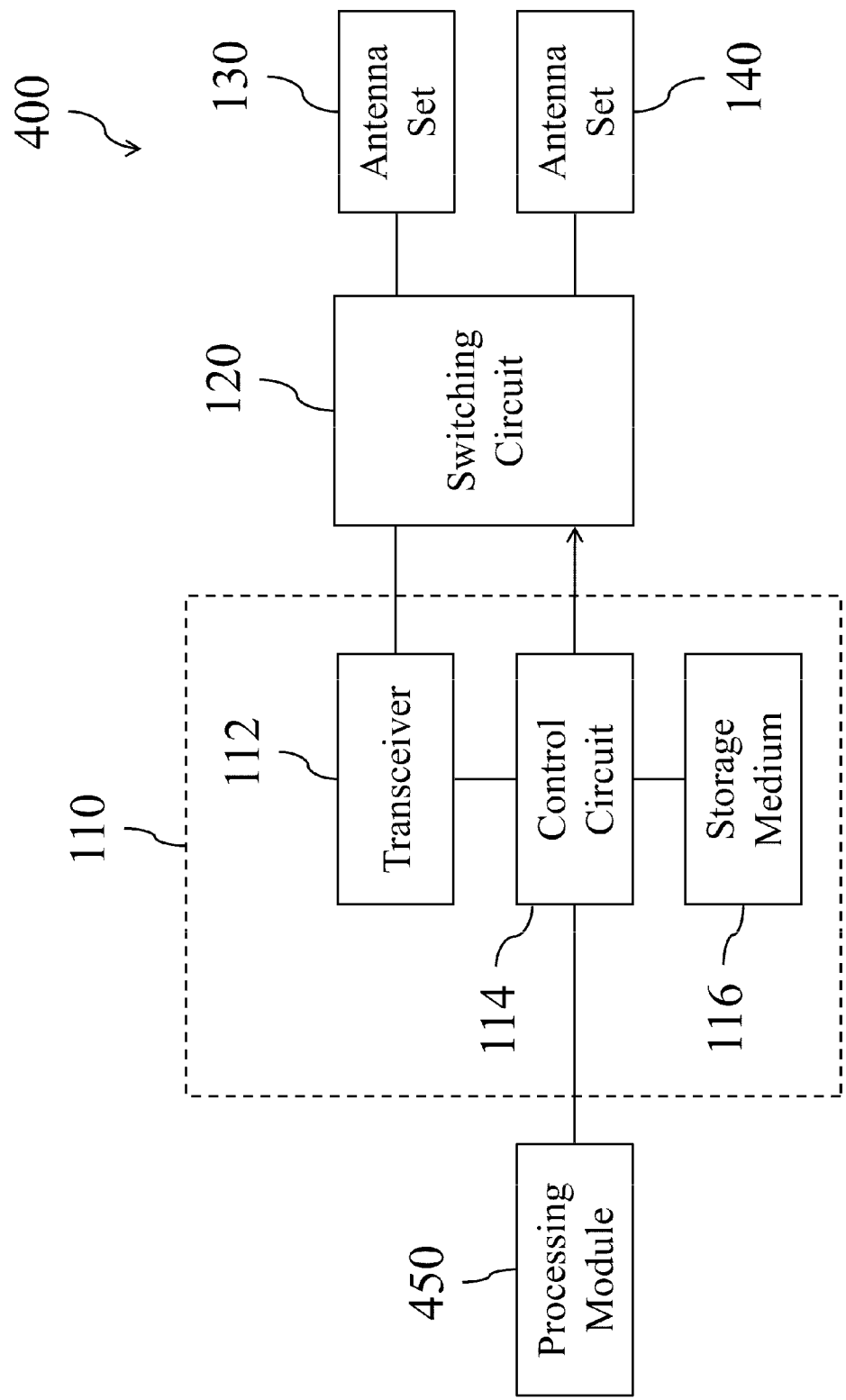
FIG. 4 is a simplified functional block diagram of a wireless communication system according to a second example embodiment.

In previous embodiments, the throughput and throughput statistic of respective antenna sets in each test period are calculated by the control circuit 114 of the wireless communication circuit 110. This is merely an example, rather than a restriction to the practical implementations. For example, FIG. 4 shows a simplified functional block diagram of a wireless communication system 400 according to a second example embodiment. In the wireless communication system 400, the control circuit 114 transmits packets processed by the transceiver 112 to a processing module 450. The processing module 450 calculates the throughput and throughput statistic of respective antenna sets in each test period, and returns calculation results to the control circuit 114, so that the control circuit 114 selects antenna set to be used according to the calculation results.

In implementations, the processing module 450 may be a desktop computer, a notebook computer, a tablet computer, a PDA, a mobile phone, a multi-media player (such as a blue ray DVD player), a CPU of a wireless AP, or the computer program products executed by above device. That is, the processing module 450 may be realized by hardware or software approaches. In some embodiments where the wireless communication circuit 110, the switching circuit 120, the antenna set 130, and the antenna set 140 should be integrated as a USB dongle, the architecture illustrated in FIG. 4 can be utilized to greatly reduce required computations of the control circuit 114, improve the antenna receiving quality of the USB dongle, and increase the transmission speed of the wireless communication system 400.

In addition, the foregoing antenna diversity mechanism can be extended to the applications where more antenna sets are employed. Further details will be described with reference to FIG. 5 and FIG. 6.

Figure 5:
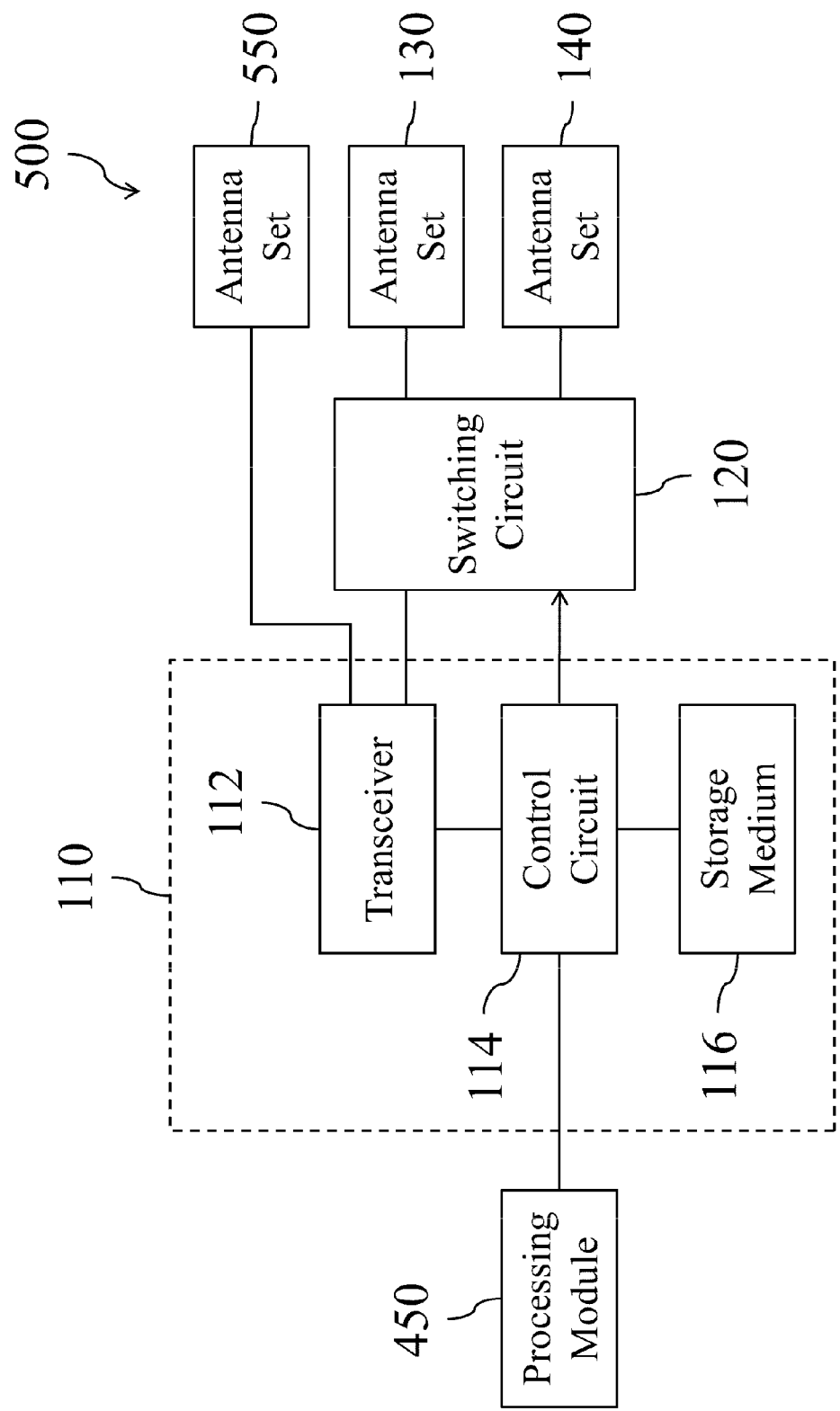
FIG. 5 is a simplified functional block diagram of a wireless communication system according to a third example embodiment.
Figure 6:
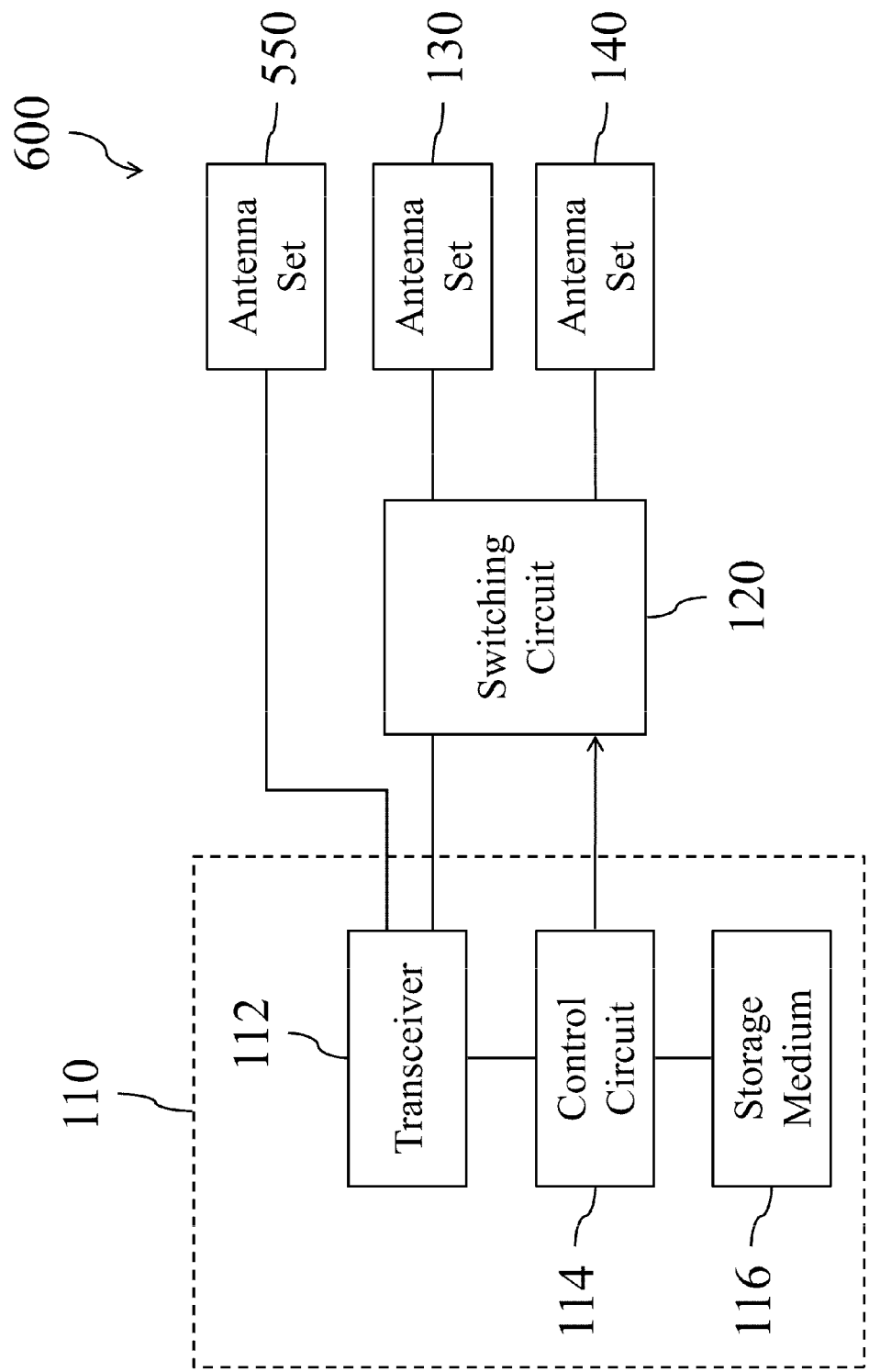
FIG. 6 is a simplified functional block diagram of a wireless communication system according to a fourth example embodiment.

FIG. 5 is a simplified functional block diagram of a wireless communication system 500 according to a third example embodiment. FIG. 6 is a simplified functional block diagram of a wireless communication system 600 according to a fourth example embodiment. In comparison with the previous wireless communication system 400, one more antenna set 550 is added in the wireless communication system 500. In the wireless communication system 500, the transceiver 112 of the wireless communication circuit 110 receives signals via two antenna sets simultaneously. The transceiver 112 combines signals received by the two antenna sets to further improve the signal receiving quality. The antenna set 550 is a default antenna set to be used by the transceiver 112. The control circuit 114 of the wireless communication circuit 110 selects one of the antenna set 130 and the antenna set 140 to cooperate with the antenna set 550 by using any of the antenna selection approaches disclosed in the previous embodiments.

The wireless communication system 600 of FIG. 6 is very similar to the wireless communication system 500 of FIG. 5, but differs from the wireless communication system 500 in terms of the component for calculating the throughput and throughput statistic of the antenna set 130 and the antenna set 140. In the wireless communication system 500, the throughput and throughput statistic of the antenna set 130 and the antenna set 140 in each test period is calculated by the processing module 450. In the wireless communication system 600, the throughput and throughput statistic of the antenna set 130 and the antenna set 140 in each test period is calculated by the control circuit 114 of the wireless communication circuit 110.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A wireless communication circuit comprising:
a transceiver for transmitting and receiving signals; and
a control circuit, coupled with the transceiver, for controlling a switching circuit to switch the transceiver to a first antenna set for a first time period and then to switch the transceiver to a second antenna set for a second time period in a test period;
wherein if a throughput statistic of the first antenna set with respect to the test period is greater than a throughput statistic of the second antenna set with respect to the test period, the control circuit configures the switching circuit to switch the transceiver to the first antenna set after the test period.

2. The wireless communication circuit of claim 1, wherein the first time period is longer than the second time period.

3. The wireless communication circuit of claim 1, wherein the throughput statistic of each antenna set is a throughput or a time average of the throughput of the antenna set in the test period.

4. The wireless communication circuit of claim 3, wherein the throughput of the antenna set is a data amount of packets having a specific coding scheme received by or transmitted from the antenna set, or a data amount of packets having a specific coding scheme received by or transmitted from the antenna set in a unit time.

5. The wireless communication circuit of claim 1, wherein the control circuit configures the switching circuit to switch the transceiver between the first antenna set and the second antenna set for multiple times in the test period.

6. The wireless communication circuit of claim 1, wherein if the throughput statistic of the first antenna set with respect to the test period is greater than the throughput statistic of the second antenna set with respect to the test period, the control circuit configures the switching circuit to switch the transceiver to the first antenna set after the test period if the first antenna set was selected more frequently than the second antenna set in antenna selection decisions made in a plurality of prior test periods.

7. A wireless communication circuit comprising:
a transceiver for transmitting and receiving signals; and
a control circuit, coupled with the transceiver, for controlling a switching circuit to switch the transceiver to a first antenna set for a first time period and then to switch the transceiver to a second antenna set for a second time period in a target test period;
wherein if a throughput statistic of the first antenna set with respect to a plurality of test periods is greater than a throughput statistic of the second antenna set with respect to the plurality of test periods, the control circuit configures the switching circuit to switch the transceiver to the first antenna set after the target test period.

8. The wireless communication circuit of claim 7, wherein the first time period is longer than the second time period.

9. The wireless communication circuit of claim 7, wherein the throughput statistic of each antenna set is a sum, an average value, a time average, a moving sum, or a moving average of throughput of the antenna set in the plurality of test periods.

10. The wireless communication circuit of claim 9, wherein the throughput of the antenna set is a data amount of packets having a specific coding scheme received by or transmitted from the antenna set, or a data amount of packets having a specific coding scheme received by or transmitted from the antenna set in a unit time.

11. The wireless communication circuit of claim 7, wherein the control circuit configures the switching circuit to switch the transceiver between the first antenna set and the second antenna set for multiple times in the target test period.

12. The wireless communication circuit of claim 7, wherein if a throughput statistic of the first antenna set with respect to the target test period is greater than a throughput statistic of the second antenna set with respect to the target test period, the control circuit configures the switching circuit to switch the transceiver to the first antenna set after the target test period if the first antenna set was selected more frequently than the second antenna set in antenna selection decisions made in a plurality of prior test periods.

13. A wireless communication circuit comprising:
a transceiver for transmitting and receiving signals; and
a control circuit, coupled with the transceiver and a switching circuit, for controlling the switching circuit to switch the transceiver between a first antenna set and a second antenna set in a first test period such that the first antenna set is coupled with the transceiver for shorter period of time than the second antenna set;
wherein if the control circuit configures the switching circuit to switch the transceiver to the first antenna set after the first test period, the control circuit configures the switching circuit to switch the transceiver between the first antenna set and the second antenna set in a second test period such that the first antenna set is coupled with the transceiver for longer period of time than the second antenna set.

14. The wireless communication circuit of claim 13, wherein the control circuit configures the switching circuit to switch the transceiver between the first antenna set and the second antenna set for multiple times in the second test period.

15. The wireless communication circuit of claim 13, wherein if a throughput statistic of the first antenna set with respect to the second test period is greater than a throughput statistic of the second antenna set with respect to the second test period, the control circuit configures the switching circuit to switch the transceiver to the first antenna set after the second test period.

16. The wireless communication circuit of claim 15, wherein the throughput statistic of each antenna set is a throughput or a time average of the throughput of the antenna set in the second test period.

17. The wireless communication circuit of claim 13, wherein if a throughput statistic of the first antenna set with respect to a plurality of test periods is greater than a throughput statistic of the second antenna set with respect to the plurality of test periods, the control circuit configures the switching circuit to switch the transceiver to the first antenna set after the second test period.

18. The wireless communication circuit of claim 17, wherein the throughput statistic of each antenna set is a sum, an average value, a time average, a moving sum, or a moving average of throughput of the antenna set in the plurality of test periods.

* * * * *